US 12,457,238 B2

(12) United States Patent
Maganti et al.

(10) Patent No.: US 12,457,238 B2
(45) Date of Patent: Oct. 28, 2025

(54) CONTINUOUS SECURITY POSTURE VALIDATION AND AUTHORIZATION TO OPERATE BASED ON AUTOMATED INTELLIGENT BOTS

(71) Applicant: AlphaOmegaIntegration, Vienna, VA (US)

(72) Inventors: Navin Maganti, Berwyn, PA (US); Mahendiranath Rangareddy, Great Falls, VA (US); Raju Gupta, Leesburg, VA (US)

(73) Assignee: AlphaOmegaIntegration, Vienna, VA (US)

( * ) Notice: Subject to any disclaimer, the term of this patent is extended or adjusted under 35 U.S.C. 154(b) by 238 days.

(21) Appl. No.: 18/312,443

(22) Filed: May 4, 2023

(65) Prior Publication Data

US 2024/0372888 A1    Nov. 7, 2024

(51) Int. Cl.
*G06F 15/16* (2006.01)
*H04L 9/40* (2022.01)
(52) U.S. Cl.
CPC ...... *H04L 63/1441* (2013.01); *H04L 63/1425* (2013.01); *H04L 63/1433* (2013.01); *H04L 63/20* (2013.01)
(58) Field of Classification Search
CPC ............ H04L 63/1441; H04L 63/1425; H04L 63/1433; H04L 63/20
See application file for complete search history.

(56) References Cited

U.S. PATENT DOCUMENTS

| | | | |
|---|---|---|---|
| 2010/0306816 A1* | 12/2010 | McGrew et al. | H04L 63/08 726/1 |
| 2023/0412626 A1* | 12/2023 | Wright | H04L 41/16 |
| 2024/0289447 A1* | 8/2024 | Blessing | G06F 21/577 |

* cited by examiner

*Primary Examiner* — Normin Abedin
(74) *Attorney, Agent, or Firm* — Pillsbury Winthrop Shaw Pittman LLP

(57) ABSTRACT

A system may select, based on execution of one or more automated selection bots, a plurality of controls from among a plurality of families of controls, each family of controls having respective controls, wherein a control from among the plurality of controls specifies protection against one or more security threats. The system may perform, based on execution of one or more automated control implementation bots, a validation operation for each control from among the selected plurality of controls to implement each control. The system may include aggregate, based on execution of the one or more automated control implementation bots, a report package based on the implemented plurality of controls. The system may generate a security posture assessment based on the report package. The system may monitor, based on execution of one or more automated monitoring bots, performance of the evaluated system based on the implemented plurality of controls.

15 Claims, 5 Drawing Sheets

CONTINUOUS SECURITY POSTURE VALIDATION AND AUTHORIZATION TO OPERATE BASED ON AUTOMATED INTELLIGENT BOTS

BACKGROUND

Many organizations are required to reference a standardized control framework when assessing the security and compliance of their information systems. Standardized control frameworks are intended to provide a model for how to protect information and data systems from threats. One comprehensive and commonly referenced framework is the National Institute of Science and Technology (NIST) Special Publication 800-53 (r4). Adherence to these controls is required for many government agencies in the United States, as well as for many private enterprises that operate within regulated markets, such as healthcare or finance. Control frameworks are used throughout commercial industries as well.

A security threat is a condition that can result in loss of data, function, and/or other aspect of a computer system. Examples of security threats may include malicious actions, structural failures such as hardware failure, human errors such as bugs in code or misconfigurations, and/or other conditions that can result in loss of data or system function. To help mitigate these security threats, computer systems may be assessed to identify and eliminate the threats. However, computer systems are usually dynamic in nature. System components may be added, removed, or reconfigured. These component changes may introduce new vulnerabilities that would not be accounted for. Whether based on changes to system components or consideration of a new computer system, determining whether or the extent to which the computer system has vulnerabilities is a difficult problem. This is at least in part because of the complexity of modern computer systems, which may lead to errors and inefficiencies. These errors and inefficiencies may result in vulnerabilities to security threats. These and other issues exist with protecting computer systems against security threats.

SUMMARY

Various systems and methods may address the foregoing and other problems of securing computer systems against threats. A system may include an intelligent bot framework having a plurality of intelligent bots that are each trained to perform one or more specific tasks for automated security posture validation. Security posture is a measure of how well a computer system is protected from security threats. The security posture may be impacted by the characteristics of the computer system. The characteristics may include the nature of the data and/or functions of the computer system. A computer system that handles more sensitive data, for example, would have an enhanced level of security requirements and therefore a different security posture than another computer system that handles less sensitive data.

Security posture validation is a complex and multi-factor process in which the security posture is evaluated to determine whether the computer system is sufficiently protected against security threats. Security posture validation will be described in the context of an authorization to operate (ATO) process, although the system may be implemented in other security compliance and remediation contexts. ATO is a formal decision by an organization's authorizing official to allow an information system, such as the evaluated system, to operate in a production environment. The ATO process is typically used by organizations that are subject to government regulations, such as the Federal Information Security Management Act (FISMA).

The complexity of modern computer systems, the level of sensitivity of these systems, and the variety of security threats makes security posture validation complex. For example, a given computer system may have a completely different set of security requirements and security posture, and therefore security posture validation, than another computer system. A computer system for which security posture validation is conducted will be referred to as an evaluated system.

The intelligent bot framework may include a plurality of bots that are each trained based on a workflow tailored for each task that a bot in the framework handles. For example, a bot may be instantiated with one or more bot parameters that define bot behavior. When the bots are instantiated, the intelligent automation framework may automatically conduct one or more operations of the security posture validation. For example, the bots in the intelligent automation framework may access a security category of the evaluated system. A security category is a level of impact that a security breach would have on the evaluated system or related systems. A security breach is an unauthorized access, use, disclosure, disruption, modification, or destruction of information. The security category of the evaluated system may define the minimum security requirements that are to be implemented to protect the evaluated system. Higher levels of impact may correspond to higher security requirements. The security category for the evaluated system may be selected based on the confidentiality, integrity, and availability of the information that would be breached, the sensitivity of the information, and the impact of a security breach on the organization that will use the evaluated system.

When the security requirements are defined and accessed, one or more bots in the intelligent automation framework may select one or more controls that would be necessary to meet the security requirements. A control is a measure or activity that is used to mitigate a risk. Controls can be preventive, detective, or corrective. Preventive controls are designed to stop a risk from occurring. Detective controls are designed to identify a risk that has occurred. Corrective controls are designed to fix a risk that has occurred. The controls may include various types of controls such as data encryption, access control, user authentication, firewalls, security audits, and/or other types of controls that can be implemented to secure the evaluated system. Data encryption may be used to protect sensitive data from unauthorized access. Access control may be used to restrict access to systems and data. User authentication may be used to verify the identity of users before they are granted access to systems. Firewalls may be used to restrict access to networks and systems. Intrusion detection and prevention systems may be used to identify and prevent unauthorized access to systems. Security audits may be used to identify security vulnerabilities and ensure that security controls are implemented effectively.

When the controls are selected, one or more bots of the intelligent automation framework may access implementation statements, security posture evidence, and/or other data relating to the security posture of the evaluated system to determine whether the requirements of the control are met and are in compliance. An implementation statement describes how a control is implemented. The implementation statement may include, without limitation, an identification of the control that is being implemented, the purpose of the control, the steps that are taken to implement the control, the resources that are needed to implement the control, the risks that are mitigated by the control, the metrics that are used to measure the effectiveness of the control, and/or other data about the planned or actual control implementation.

The security posture evidence is data that indicates the security posture of the evaluated system. Examples of the security posture evidence may include scan data (such as from vulnerability scanners), audit data, log data, file object data from file systems that indicate file access, machine data, data indicating user access control, and/or other data indicating the security posture of the evaluated system.

Audit data is data that is collected and analyzed by auditors to assess the effectiveness of an organization's internal controls. Audit data can be collected from a variety of sources, including financial statements, operational data, and interviews with employees. Audit data may be used to identify potential risks and vulnerabilities in an organization's internal controls. Audit data may be used to assess the effectiveness of the organization's risk management program. This information can be used to identify areas where the organization is not adequately managing risks.

Log data is data that is generated by computer systems and applications to store information that identifies activities that take place on the evaluated system. The log data may include system logs, application logs, and security logs. The system logs may contain information about the activities that take place on a system, such as who logged in, what files were accessed, and what changes were made. The application logs may contain information about the activities that take place in an application, such as which users are using the application, what data is being entered, and what errors are occurring. The security logs may contain information about security events, such as unauthorized access attempts, malicious activity, and data breaches. The log data may be collected from various sources such as operating systems, applications, security devices, network devices, and/or other log sources.

The log data may be used to assess the effectiveness of the controls used in the evaluated system. The log data may be used to identify potential security risks, such as unauthorized access attempts or malicious activity. Log data can also be used to investigate security incidents, such as data breaches or denial-of-service attacks.

The Active Directory (AD) data is data generated by a directory service that is used to store information about users, computers, and other resources in a network. AD data is used to authenticate users, authorize access to resources, and manage the network. The AD data may be used to assess the effectiveness of the organization's controls. For example, the AD data may be used to identify potential security risks, such as unauthorized access attempts or malicious activity. AD data may also be used to investigate security incidents, such as data breaches or denial-of-service attacks. The AD data may include user data, computer data, group data, security data, and/or other data stored or produced by the evaluated system. The user data may contain information about users, such as their name, email address, and group memberships. The computer data may contain information about computers, such as their name, Internet Protocol (IP) address, and operating system. Group data: This data includes information about groups, such as their name, members, and permissions. The security data may contain information about security, such as account lockouts, failed login attempts, and security policies. The AD data may be collected from a various sources such as AD Domain Services servers, AD Lightweight Directory Services servers, file systems, databases, and/or other sources.

Machine data is information that is generated by machines, such as sensors, computers, and/or other devices accessed, used by, or included in the evaluated system 101. The machine data may include data about the machine's operations, its environment, and its interactions with other machines. Machine data may be generated for machine performance, detecting and preventing problems, and making decisions. In this context, the security of machine data is used in the security posture validation. For example, if machine data is not protected, the data can be accessed by unauthorized actors, which may lead to malicious disruption of machine operations, stolen data, or attacks on other machines in the evaluated system.

The security posture evidence may be provided or otherwise access from evaluated system. In some examples, at least some of the security posture evidence may be requested by one or more of the bots. For example, one or more scan bots may request scans to be conducted and then access the results of the scans.

Once the input data is accessed from the evaluated system, one or more bots of the intelligent automation framework may select one or more controls. A control is a measure or activity that is used to mitigate a risk. Controls can be preventive, detective, or corrective. Preventive controls are designed to stop a risk from occurring. Detective controls are designed to identify a risk that has occurred. Corrective controls are designed to fix a risk that has occurred. The controls may include various types of controls such as data encryption, access control, user authentication, firewalls, security audits, and/or other types of controls that can be implemented to secure the evaluated system. Data encryption may be used to protect sensitive data from unauthorized access. Access control may be used to restrict access to systems and data. User authentication may be used to verify the identity of users before they are granted access to systems. Firewalls may be used to restrict access to networks and systems. Intrusion detection and prevention systems may be used to identify and prevent unauthorized access to systems. Security audits may be used to identify security vulnerabilities and ensure that security controls are implemented effectively.

One or more bots of the intelligent automation framework may implement the selected controls. Implementation may include ensuring the selected controls have been self-assessed and are supported by appropriate evidence and artifacts. In some examples, implementation may include installing and configuring the controls.

One or more bots of the intelligent automation framework may monitor the controls. Monitoring may include identifying any changes in the threats or risks, measuring the effectiveness of the controls, and making recommendations for improvement. In some examples, the monitoring may be continuous, such as repeated at intervals. Continuous monitoring may enable updates to the security posture validation and remediation based on changes to the security posture and/or security requirements.

Based at least on the selection, implementation, and monitoring of controls, the bots of the intelligent automation framework may generate a security posture assessment. The security posture assessment may include compliance information. The compliance information may include a determination of whether the security posture of the evaluated system is in compliance with the security requirements, which may be based on the category of the evaluated system.

For example, the compliance information may include whether the selected one or more controls are in compliance with its intended purpose. The compliance information or evidence may be attached to a Governance, Risk, and Compliance (GRC) tool for each control. The GRC tool may be an application that helps organizations to manage their GRC programs. GRC tools can be used to assess risks, identify controls, and track compliance with regulations. An authorizing official may use the GRC tool to generate an ATO result, which may include an ATO grant, an ATO denial, or an ATO suspension.

The systems and methods disclosed herein may reduce computational complexity and execution times for conducting tasks for security posture validation, reduces errors, supports continuous monitoring, and enables efficient detection and resolution of vulnerabilities to improve the security posture of the evaluated system. For example, among other benefits, the systems and methods may automate control validation, facilitate mitigation and elimination of known risks, and permit additional control validation and search for unknown risks. The unknown risk may be validated using the automation for vulnerabilities and patch management. Once identified, this information may be used for response and mitigation strategies.

The system provides transparency, automated discovery of ATO process execution and tasks involved in ATO, and identification of inefficiencies in achieving and sustaining ATO. The system may do so in an extensible manner with minimal change in systems, data, and human activities. The system may implement configurable intelligent bots driving data collection, aggregation, and analysis to execute and manage ATO processes. The system may further monitor and optimize the ATO process for continuous ATO, reduce of time and cost associated with ATOs, promote consistency in results and continuous compliance and monitoring, decrease the system risk to agencies or other organizations, accelerates time to achieving and maintaining ATO, drives innovation and change, and increases compliance scores with automated evidence.

BRIEF DESCRIPTION OF THE DRAWINGS

Features of the present disclosure may be illustrated by way of example and not limited in the following figure(s), in which like numerals indicate like elements, in which.

DETAILED DESCRIPTION

A comprehensive security posture can help to prevent security threats. The security posture may help to ensure compliance with regulations. Validating the security posture may be prone to errors, be unpredictable, and computationally and time intensive. Various systems and methods may improve security posture validation and the security posture itself based on an intelligent automation framework that automatically performs control selection, control implementation, and continuous monitoring of the controls and evaluated system.

Figure 1:
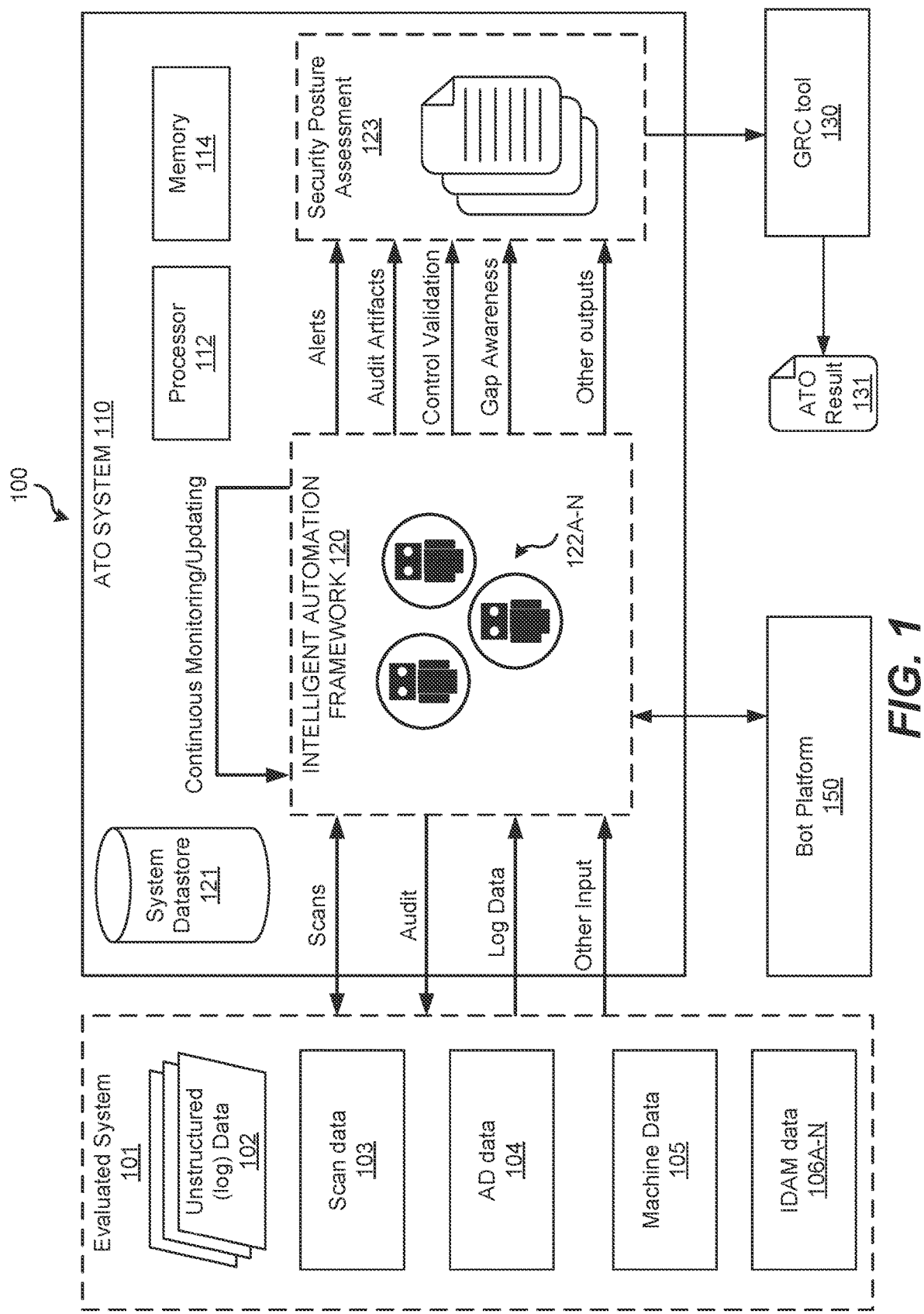
FIG. 1 illustrates an example of a system environment for security posture validation and authorization to operate based on automated intelligent bots.

FIG. 1 shows an example of a system environment 100 for security posture validation and authorization to operate based on automated intelligent bots, according to an implementation. The system environment 100 may include an evaluated system 101, an ATO system 110, a GRC tool 130, a bot platform 150, and/or other features.

The evaluated system 101 is a computer system having software, hardware, data, and/or other components that are to be evaluated by the ATO system 110. The ATO system 110 is a computer system that uses an intelligent automation framework 120 to automatically evaluate the security posture of the evaluated system 101. The ATO system 110 may include a processor 112, a memory 114, a system datastore 121, and/or other features. The memory 114 may store the intelligent automation framework 120, which may be implemented by the processor 112 to automatically evaluate the security posture of the evaluated system 101. For example, the intelligent automation framework 120 may generate a security posture assessment 123 of the evaluated system 101, which may be used by a GRC tool 130 to generate an ATO result 131. The ATO result 131 may include a Conditional ATO, Full ATO grant, an ATO denial, or ATO suspension. A conditional ATO means that ATO is granted subject to fulfillment of one or more conditions. A full ATO grant means that the evaluated system 101 has been assessed and found to meet all security requirements. The evaluated system 101 can then be operated with confidence that it is secure. ATO denied means that the evaluated system 101 has not been assessed or has not met all security requirements. The evaluated system 101 cannot be operated until it has been brought into compliance with all security requirements. ATO suspended means that the evaluated system 101 is currently not authorized to operate. This may be due to a security incident, a change in security requirements, or a pending assessment. The evaluated system 101 will not be authorized to operate until the issue has been resolved.

Figure 2:
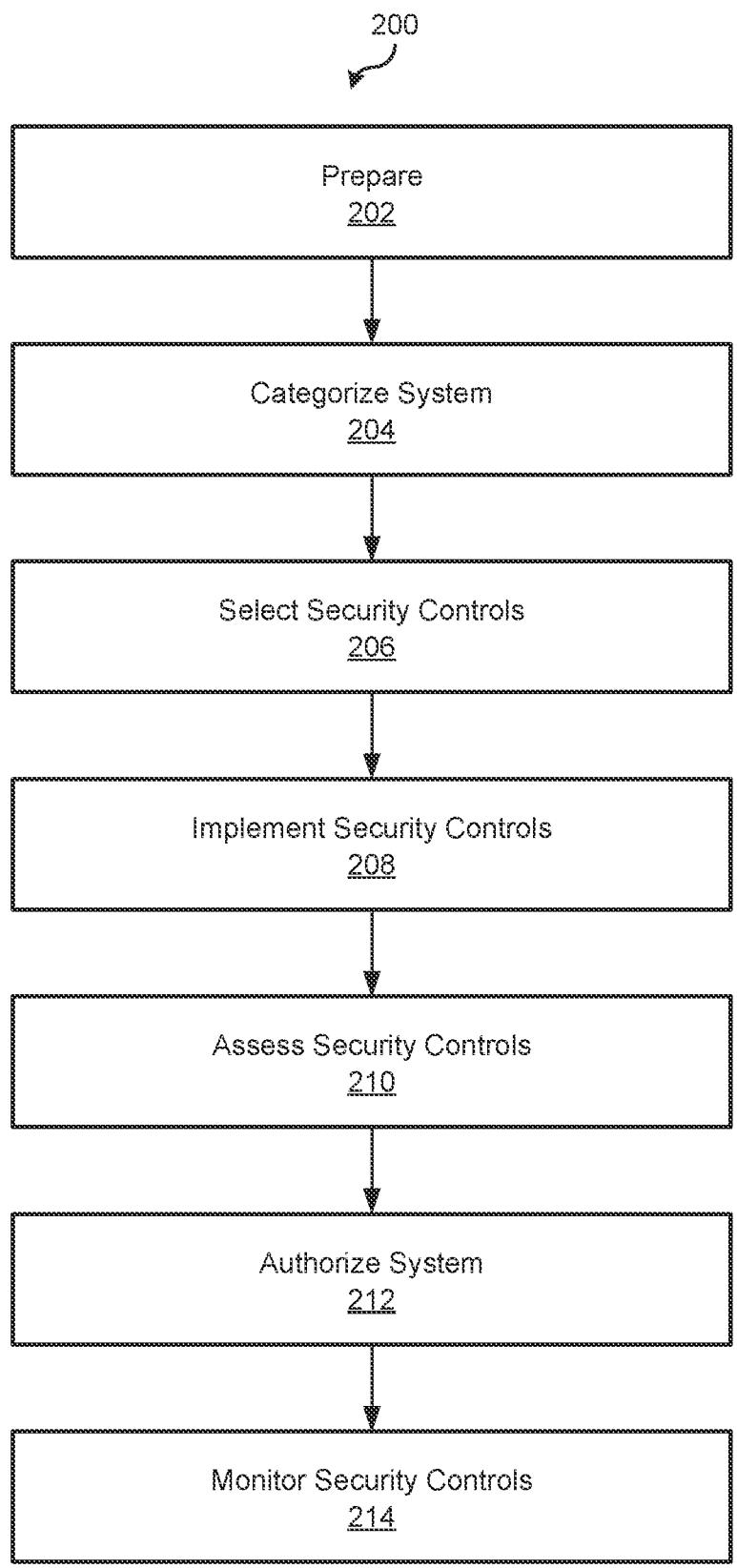
FIG. 2 illustrates a flow diagram for an example of security posture validation in the context of an authorization to operate ("ATO") process.

To provide context for the automated security posture validation, an example of a security posture validation in the context of an ATO will be described. For example, FIG. 2 illustrates a flow diagram 200 for an example of security posture validation in the context of an ATO process. Other implementations for the security posture validation may be used as well or instead, such as to identify vulnerabilities or other weaknesses in the evaluated system 101 and/or to improve the security posture of the evaluated system 101. The ATO may be specified by an ATO authorization package, which defines information that an authorizing official uses to determine whether to authorize the operation of an information system or the provision of a designated set of common controls.

The intelligent automation framework 120 may orchestrate bots 122 to perform some or all of the ATO process. Particular efficiency in automatically evaluating the security posture of the evaluated system 101 may be achieved by implementing 206, 208, and 214, although efficiencies may be achieved through additional or alternative operations as well. The security posture validation may include multiple operations to manage information security and privacy risk.

At 202, the security posture validation may include a preparation operation. The preparation operation may gather information about the evaluated system 101 that will be categorized into a security category. The information may include the type, purpose, or criticality of the evaluated system 101, the level of sensitivity of the data or service of the evaluated system 101, and the potential impact of a security breach.

At 204, the security posture validation may include a categorization operation. The categorization operation may include selecting a security category for the evaluated system 101 based on the data, system assets, and/or other features of the evaluated system 101. A security category is a level of impact that a security breach would have on the evaluated system 101 or related systems. A security breach is an unauthorized access, use, disclosure, disruption, modification, or destruction of information. There may be two or more security categories. In some examples, there may be three security categories: a low impact, a medium impact, and a high impact. The security category of the evaluated system 101 may define the minimum security requirements that are to be implemented to protect the evaluated system 101. Higher levels of impact may correspond to higher security requirements. The security category for the evaluated system 101 may be selected based on the confidentiality, integrity, and availability of the information that would be breached, the sensitivity of the information, and the impact of a security breach on the organization that will use the evaluated system 101.

In some examples, the security categories may be selected based on the minimum security minimum security requirements are in National Institute of Standards and Technology (NIST) Special Publication 800-53, which is incorporated by reference in its entirety herein for all purposes. In some examples, the FIPS 199 may be used to produce security categorization within the system to ensure confidentiality, integrity and availability. FIPS 199, is a United States Federal Government standard that establishes security categories of information systems used by the Federal Government. FIPS 199 was developed by the NIST and published in 2002. The FIPS 199 definition is incorporated by reference in its entirety herein for all purposes.

At 206, the security posture validation may include selection of controls. A control is a measure or activity that is used to mitigate a risk. Controls can be preventive, detective, or corrective. Preventive controls are designed to stop a risk from occurring. Detective controls are designed to identify a risk that has occurred. Corrective controls are designed to fix a risk that has occurred. The controls may include various types of controls such as data encryption, access control, user authentication, firewalls, security audits, and/or other types of controls that can be implemented to secure the evaluated system 101. Data encryption may be used to protect sensitive data from unauthorized access. Access control may be used to restrict access to systems and data. User authentication may be used to verify the identity of users before they are granted access to systems. Firewalls may be used to restrict access to networks and systems. Intrusion detection and prevention systems may be used to identify and prevent unauthorized access to systems. Security audits may be used to identify security vulnerabilities and ensure that security controls are implemented effectively.

Controls may be grouped into families of controls. The family of controls may include: Audit and Accountability, Awareness and Training, Configuration Management, Contingency Planning, Identification and Authentication, Incident Response, Maintenance, Media Protection, Personnel Security, Physical and Environmental Protection, Planning, Program Management, Risk Assessment, Security Assessment and Authorization, System and Communications Protection, System and Information Integrity, System and Services Acquisition, and/or other families.

The intelligent automation framework 120 may include bots 122 that select some or all of the controls in the families of control and/or some or all types of controls. The selection of controls may be based on the category of the evaluated system 101, the type of system, cost of controls, effectiveness of controls, availability of controls, compliance requirements, and/or other factors. Higher impact levels may be correlated with more controls to be selected for implementation. The type of system. The type of system may also affect the type of controls that need to be implemented. For example, a system that handles sensitive data will need to have different controls than a system that does not handle sensitive data. The cost of the controls may be required to be cost-effective based on a predefined cost model. The controls to be implemented should be available for implementation within the constraints of the organization. The controls that are selected should be effective in mitigating the risks posed to the system. It should be noted that selection of controls may be an iterative process in which controls may be added or removed on a continuous bases to mitigate current risks and vulnerabilities.

Table 1 below lists examples of controls that may be selected by one or more bots 122 of the intelligent automation framework 120.

| Control Family | Control |
|---|---|
| Access Control | Access Enforcement |
| Access Control | Information Flow |
| Access Control | Separation of Duties |
| Access Control | Unsuccessful Login Attempts |
| Audit and Accountability | Auditable Events |
| Audit and Accountability | Content of Audit Records |
| Audit and Accountability | Audit Review, Analysis, and Reporting |
| Security Assessment and Authorization | Security Assessment |
| Security Assessment and Authorization | Systems Interconnections |
| Security Assessment and Authorization | Security Authorizations |
| Configuration Management | Access Restriction for Change Control |
| Configuration Management | Configuration Settings |
| Configuration Management | User Installed Software |
| Contingency Planning | Information System Recovery and Reconstitution |
| Identification and Authentication | Identification and Authentication (Organizational Users) |
| Identification and Authentication | Authenticator Management |
| Identification and Authentication | Identification and Authentication (Non- |

-continued

| Control Family | Control |
| --- | --- |
| | Organizational Users) |
| Incident Response | Incident Handling |
| Incident Response | Incident Monitoring |
| Incident Response | Incident Reporting |
| Incident Response | Incident Response Assistance |
| Physical Environment and Environmental Protection | Emergency Power |
| Physical Environment and Environmental Protection | Temperature Controls |
| Personnel Security | Personnel Termination |
| Risk Assessment | Vulnerability Scanning |
| Systems and Communication Protection | Network Disconnect |
| Systems and Information Integrity | Malicious Code Protection |
| Systems and Information Integrity | Error Handling |

At 208, the security posture validation may include implementation of the selected controls. Implementation may include ensuring the selected controls have been self-assessed and are supported by appropriate evidence and artifacts. In some examples, implementation may include installing and configuring the controls.

At 210, the security posture validation may include an assessment of the effectiveness of the security controls. The assessment may include identifying any weaknesses in the controls, measuring their effectiveness, and making recommendations for improvement. In some examples, the assessment may include generating or accessing a security assessment plan, conducting the assessment, and producing a assessment report for the applicable system controls.

At 210, the security posture validation may include an authorization of the use of the evaluated system 101. The authorization may include granting access to authorized users, monitoring access to ensure that it is appropriate, and taking action against unauthorized users.

At 214, the security posture validation may include monitoring the controls. Monitoring may include identifying any changes in the threats or risks, measuring the effectiveness of the controls, and making recommendations for improvement.

At 216, the security posture validation may include remediation of any deficiencies in the controls. Remediation may include fixing any vulnerabilities, updating software, implementing new controls, deprecating controls, updating controls, and/or otherwise addressing the deficiencies. Some or all of 202-216 may be automatically implemented by the intelligent automation framework 120.

Returning to FIG. 1, the intelligent automation framework 120 may include a plurality of bots 122 (illustrated as bots 122A-N). The intelligent automation framework 120 may orchestrate the plurality of bots 122 to automatically conduct some or all of the security posture validation to evaluate the security posture of the evaluated system 101. A bot 122 is logic that encodes one or more specific tasks for evaluating the security posture of a system such as the evaluated system 101. Each bot 122 may be instantiated based on one or more bot parameters. Instantiated means creating an instance of, or otherwise creating executable logic, for the processor 112 to execute. The instance or executable logic may be, but is not necessarily, object-oriented. The bot parameters may include instructions, data, input/output (I/O) interfaces, decision logic, and/or other features. The bot parameters may be stored in the system datastore 121. As new bots 122 are generated, their corresponding bot parameters may be stored in the system datastore 121 for retrieval and instantiation in the intelligent automation framework 120 as needed. The instructions may include software code written in a programming language that programs operations of the bot 122. The data may include information such as parameters and configurations used to conduct the operations. The I/O interfaces may receive data inputs and provide data outputs. The decision logic may include programming that allows the bot 122 to make decisions. The decision logic may be rule-based, artificial intelligence (AI) and machine learning based, and/or preconfigured. Rule-based examples of decision logic may include predefined rules that define decisions, such as an if-then construct. AI and machine learning based examples of decision logic may include learning from training data to make decisions. Preconfigured examples of decision logic may include predefined instructions that are integrated, such as hard-coded, within the bot 122.

Each bot 122 in the intelligent automation framework 120 may perform a respective set of one or more tasks. For example, each bot 122 may have a dedicated task to perform for evaluating security posture of the evaluated system 101. In this sense, at least one bot 122 may be specialized to automatically perform a specific task. The term "automatic" and similar terms refer to being able to execute all of a task without human intervention. These examples will also be referred to as human-not-in-the-loop (HNITL) examples. In some examples, the term "automatic" and similar terms refer to being able to some of a task with human intervention, such as to provide selectable options to the user. These examples will also be referred to as human-in-the-loop (HITL) examples.

In some examples, the intelligent automation framework 120 may use a pluggable architecture in which bots 122 may be added, removed, or updated as needed. For example, a first evaluated system 101 may have different security posture requirements that may be different than another (second) evaluated system. In this example, the first evaluated system 101 may have a first intelligent automation framework 120 having a first set of bots 122 that is different than a second intelligent automation framework 120 having a second set of bots 122 used for a second evaluated system 101. Likewise, updates to the evaluated system 101 may cause a different intelligent automation framework 120 to be used. For example, an evaluated system 101 may have different security posture requirements at different times. In this example, the evaluated system 101 may have a first intelligent automation framework 120 having a first set of bots 122 for a first version of the evaluated system that is different than a second intelligent automation framework 120 having a second set of bots 122 used for a second version of the evaluated system 101. The first version may have different software, hardware, data, configurations, and/or other features than the second version, resulting in different security posture requirements.

The intelligent automation framework 120 may instantiate the bots 122 using the bot parameters. In some examples, the intelligent automation framework 120 may use a bot platform 150. In these examples, the ATO system 110 may transmit the bot parameters to the bot platform 150 for implementing the intelligent automation framework 120. The bot platform 150 is a computer system that instantiates and/or executes the bots 122 based on the bot parameters. The bot platform 150 may be a standalone computer system or integrated with the ATO system 120. Examples of the bot platform 150 include UIPATH, AUTOMATION ANYWHERE, POWER AUTOMATE, KOFAX, and/or other bot platforms.

The intelligent automation framework 120 may access input data relating to the evaluated system 101. The input data may include unstructured data 102 such as log data, scan data 103, AD data 104, machine data 105, Identity and Access Management (IDAM) data 106, and/or other data that may be used for automated security posture validation by the intelligent automation framework 120. At least some of the input data may be provided by the evaluated system 101 or operator of the evaluated system 101. In some examples, the intelligent automation framework 120 may cause scans, audits, and/or other operations to be conducted on the evaluated system 101 to generate the input data.

The unstructured data 102 may include log data that is unstructured and parsed by one or more bots 122 of the intelligent automation framework 120. Log data is data that is generated by computer systems and applications to store information that identifies activities that take place on the evaluated system. The log data may include system logs, application logs, and security logs. The system logs may contain information about the activities that take place on a system, such as who logged in, what files were accessed, and what changes were made. The application logs may contain information about the activities that take place in an application, such as which users are using the application, what data is being entered, and what errors are occurring. The security logs may contain information about security events, such as unauthorized access attempts, malicious activity, and data breaches. The log data may be collected from various sources such as operating systems, applications, security devices, network devices, and/or other log sources.

The log data may be used to assess the effectiveness of the controls used in the evaluated system. The log data may be used to identify potential security risks, such as unauthorized access attempts or malicious activity. Log data can also be used to investigate security incidents, such as data breaches or denial-of-service attacks.

The scan data 103 may include Assured Compliance Assessment Solution (ACAS) scan data, Security Technical Implementation Guide (STIG) scan data, and/or other types of scan data. Examples of ACAS and STIG scan data are described at FIG. 3.

The AD data 104 is data generated by a directory service that is used to store information about users, computers, and other resources in a network. AD data 104 is used to authenticate users, authorize access to resources, and manage the network. The AD data 104 may be used to assess the effectiveness of the organization's controls. For example, the AD data 104 may be used to identify potential security risks, such as unauthorized access attempts or malicious activity. AD data 104 may also be used to investigate security incidents, such as data breaches or denial-of-service attacks. The AD data 104 may include user data, computer data, group data, security data, and/or other data stored or produced by the evaluated system. The user data may contain information about users, such as their name, email address, and group memberships. The computer data may contain information about computers, such as their name, Internet Protocol (IP) address, and operating system. Group data: This data includes information about groups, such as their name, members, and permissions. The security data may contain information about security, such as account lockouts, failed login attempts, and security policies. The AD data 104 may be collected from a various sources such as AD Domain Services servers, AD Lightweight Directory Services servers, file systems, databases, and/or other sources.

Machine data 105 is data that is generated by machines, such as sensors, computers, and/or other devices accessed, used by, or included in the evaluated system 101. The machine data 105 may include data about the machine's operations, its environment, and its interactions with other machines. Machine data 105 may be generated for machine performance, detecting and preventing problems, and making decisions. In this context, the security of machine data 105 is used in the security posture validation. For example, if machine data 105 is not protected, the data can be accessed by unauthorized actors, which may lead to malicious disruption of machine operations, stolen data, or attacks on other machines in the evaluated system.

The IDAM data 106 is data that is used by identity and access management (IAM) systems. The data may include information about users, groups, resources, and policies. IAM systems use this data to control access to resources, such as applications, data, and systems.

Other types of input data may be used, including audit data. Audit data is data that is collected and analyzed by auditors to assess the effectiveness of an organization's internal controls. Audit data can be collected from a variety of sources, including financial statements, operational data, and interviews with employees. Audit data may be used to identify potential risks and vulnerabilities in an organization's internal controls. Audit data may be used to assess the effectiveness of the organization's risk management program. This information can be used to identify areas where the organization is not adequately managing risks. The input data may be stored in the system datastore 121 for later retrieval and reference.

Figure 3:
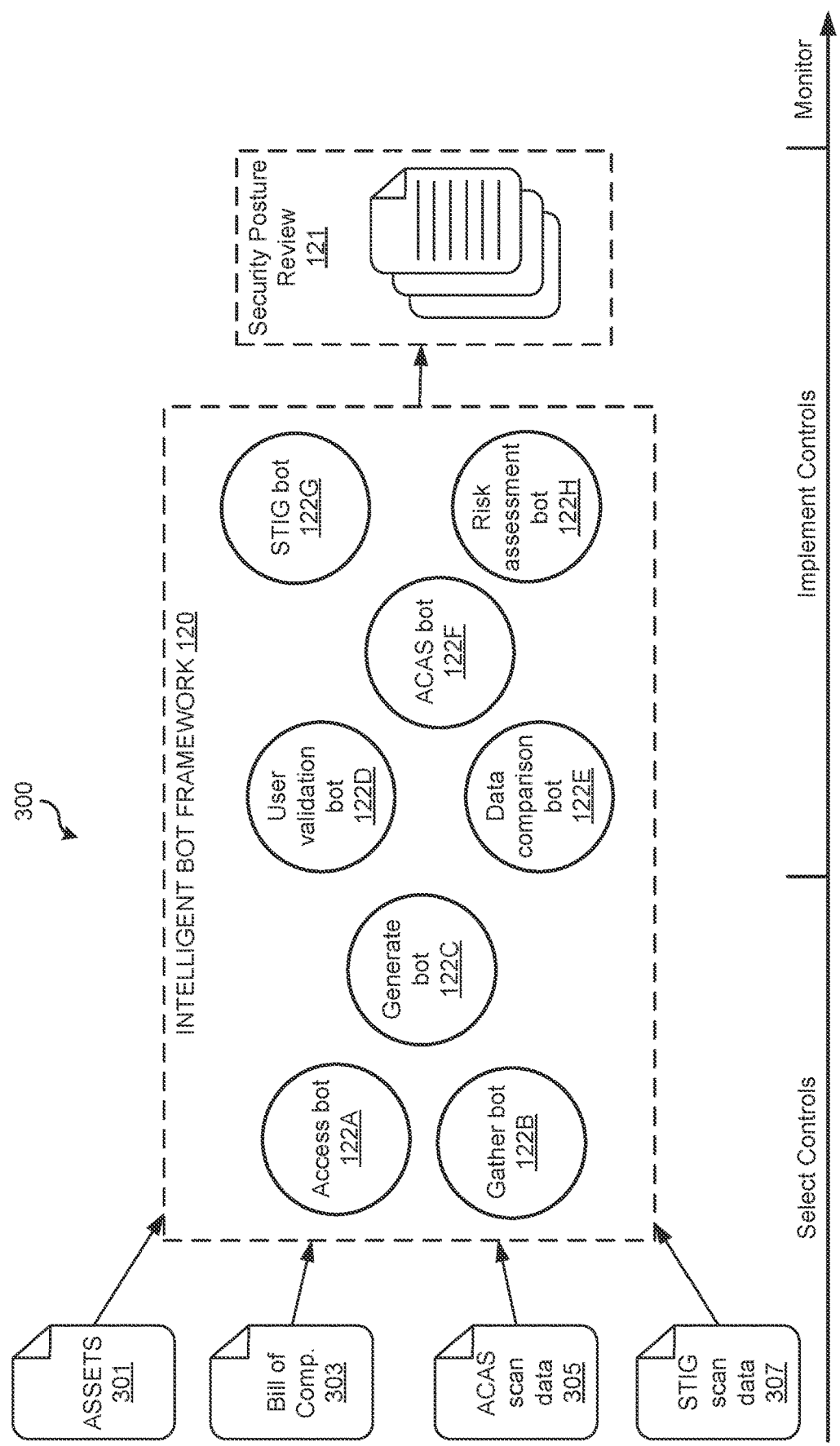
FIG. 3 illustrates a schematic diagram of examples of bots in an intelligent automation framework for security posture validation.

FIG. 3 illustrates a schematic diagram 300 of examples of bots 122A-H in an intelligent automation framework 120 for security posture validation. For example, the schematic diagram 300 shows examples of instantiation of controls via bots 122A-H. The intelligent automation framework 120 may access input data such as assets 301, a bill of components ("comp.") 303, ACAS scan data 305, STIG scan data 307 (or other types of scan data), and/or other inputs.

The assets 301 may include a listing of software, hardware, and/or other components used by the evaluated system 101. The bill of components 303 may be used to identify the components that are needed to build the evaluated system 101, calculate the cost of the evaluated system 101, track the inventory of components, track the progress of development and implementation of components of the evaluated system 101, identify potential quality problems, generate reports on the use of components, and/or in other ways.

The ACAS scan data 305 may include vulnerability scans to identify and assess security risks. For example, the ACAS scan data 305 may be used to, without limitation, identify potential security vulnerabilities in the evaluated system 101, assess the risk posed by security vulnerabilities, prioritize the remediation of security vulnerabilities, track the progress of remediation activities, and/or generate reports on the security of the evaluated system 101.

The Security Technical Implementation Guides (STIG) scan data 307 may provide technical guidance on how to configure information systems such as the evaluated system 101 to meet specific security requirements. STIG scan data 307 may include the output of a security assessment that uses a STIG document having the technical guidance to evaluate the configuration of the evaluated system 101. The STIG scan data 307 may be used to, without limitation, identify security configuration issues that need to be addressed before the information system can be authorized to operate, assess the risk posed by security configuration issues, prioritize the remediation of security configuration issues, track the progress of remediation activities, and/or generate reports on the security of information systems.

Based on these and/or other inputs, the bots 122 of the intelligent automation framework 120 may each perform specific and respective tasks in support of automated security posture validation. For example, intelligent automation framework 120 may include, without limitation, an access bot 122A, a gather bot 122B, a generate bot 122C, a user validation bot 122D, a data comparison bot 122E, an ACAS bot 122F, a STIG bot 122G, and a risk assessment bot 122H. The bots 122A-H may each be developed based on the control requirements and validation process flows as the inputs. Each of the bots 122A-H may output corresponding validated evidence and support to attach to each of the controls.

Figure 4:
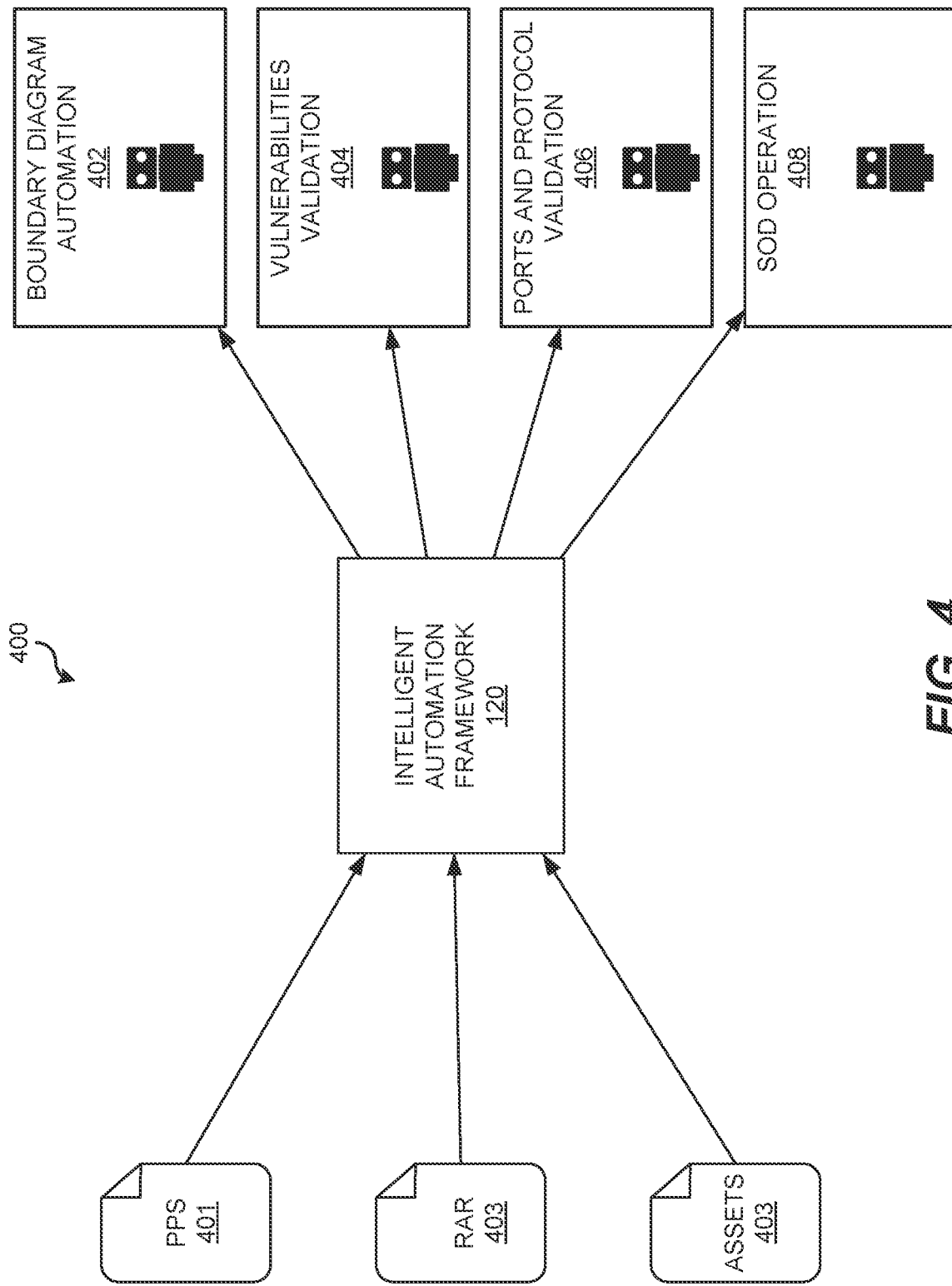
FIG. 4 illustrates a schematic diagram of examples of automated tasks performed by bots in an intelligent automation framework for security posture validation.

FIG. 4 illustrates a schematic diagram 400 of examples of automated tasks performed by bots in an intelligent automation framework 120 for security posture validation. The automated tasks may include, without limitation, boundary diagram automation 402, vulnerabilities validation 404, ports and protocol validation 406, and segregation of duties (SOD) operation 408.

The boundary diagram automation 402 may create and/or validate a boundary diagram based on system complexity. A boundary diagram is a representation of the evaluated system 101 and its components. This can help to identify potential security risks and to ensure that appropriate security controls are in place. A boundary diagram may include, without limitation, the evaluated system 101 and its, components, interfaces between the components, and/or security controls that are in place. A boundary diagram may be used to identify potential security risks by identifying vulnerabilities in the components of the evaluated system 101 or in the interfaces between the components. The boundary diagram can also be used to ensure that appropriate security controls are in place by looking for gaps in the security controls or by looking for controls that are not effective. In some examples, the boundary diagram may be used to track the implementation of the selected and implemented controls. Boundary diagrams may be used to track the implementation of security controls by showing the status of each control (such as planned, implemented, tested, and in use).

The vulnerabilities validation 404 may review and validate that the evaluated system 101 has been patched based on results of the system scans. Vulnerabilities validation 404 may compare vulnerability information about systems and ensures that the systems in a certain environment have been patched for those vulnerabilities by comparing the risk assessment report against information against the system scan information. Vulnerabilities validation 404 may identify whether that the evaluated system 101 is actually protected against the vulnerabilities that have been identified. This is done by testing the controls that are in place to see if they are effective in mitigating the risks posed by the vulnerabilities. Vulnerabilities validation 404 may ensure that the evaluated system 101 is actually secure before it is authorized to operate. The validation may protect the evaluated system 101 from unauthorized access, use, disclosure, disruption, modification, or destruction. The vulnerability validation 404 may be conducted in various ways, such as via a vulnerability scanner and/or penetration testing. The vulnerability scanner may generate a report that lists the vulnerabilities that have been identified. A penetration test is a simulated attack on the evaluated system 101 that is designed to identify vulnerabilities that could be exploited by an attacker. Once vulnerabilities have been identified, they may be prioritized in way that more critical vulnerabilities are to be remediated before less critical vulnerabilities. Remediation may include, without limitation, patching the vulnerability, configuring the control to mitigate the risk, implementing a compensating control.

After vulnerabilities have been remediated, the vulnerabilities may be monitored, such as on a continuous basis. Continuous monitoring may ensure that the vulnerabilities do not reappear and that the security controls are effective in mitigating the risks posed by the vulnerabilities.

The ports and protocol validation 406 may review and validate that ports and protocols are identified and captured in the boundary diagram and Interface Services Agreements (ISA's). Ports and protocol validation 406 may compare the scanned/discovered ports and protocols against boundary diagram. The reverse may also be checked to ensure all ports and protocols listed in the boundary diagram against scanned/discovered ports and protocols. Any missing information in either file will create an exception that is written to an output file. The ports and protocol validation 406 may include a security process that ensures that only authorized traffic is allowed to access a system or network. It does this by verifying that the traffic is coming from a valid source and that it is using a valid protocol. Ports are used to identify specific services on a system or network. For example, port 80 is used for HTTP traffic, and port 443 is used for HTTPS traffic. Protocols are the rules that govern how data is exchanged between two systems. For example, the Hypertext Transfer Protocol (HTTP) is the protocol used for web traffic. Ports and protocol validation 406 may be used to protect the evaluated system 101 from a variety of attacks, including port scans and protocol attacks. Port scans are used to identify open ports on a system or network. This information can then be used to launch attacks, such as denial-of-service attacks. Protocol attacks are attacks that exploit vulnerabilities in specific protocols. Ports and protocol validation 406 be implemented using a variety of tools and techniques, including, without limitation, firewalls, intrusion detection systems, and/or network access control systems. Firewalls may be used to block traffic to and from specific ports. Intrusion detection systems may be used to detect suspicious traffic, such as port scans and protocol attacks. Network access control systems may be used to control access to a network based on the identity of the user or device.

The SOD operation 408 may identify and confirm SOD compliance. The SOD operation 408 may compare information in the "User Description" to the "Roles". The SOD operation 408 may ensure that the users listed have the proper security roles outlined. If a user has conflicting roles based on the values in their user description an exception is generated in the output file. SOD is a control that may prevent fraud and errors by ensuring that no one person has complete control over a transaction or process. Thus, different people may be responsible for different tasks, such as authorizing, recording, and processing transactions. This helps to ensure that one person cannot commit fraud or make an error without someone else noticing. SOD may be implemented in various ways, such as, without limitation, creating separate roles for different tasks, and/or restricting a single user from authorizing and recording a transaction. The SOD operation 408 may ensure that these and/or other SOD compliance is being met.

Figure 5:
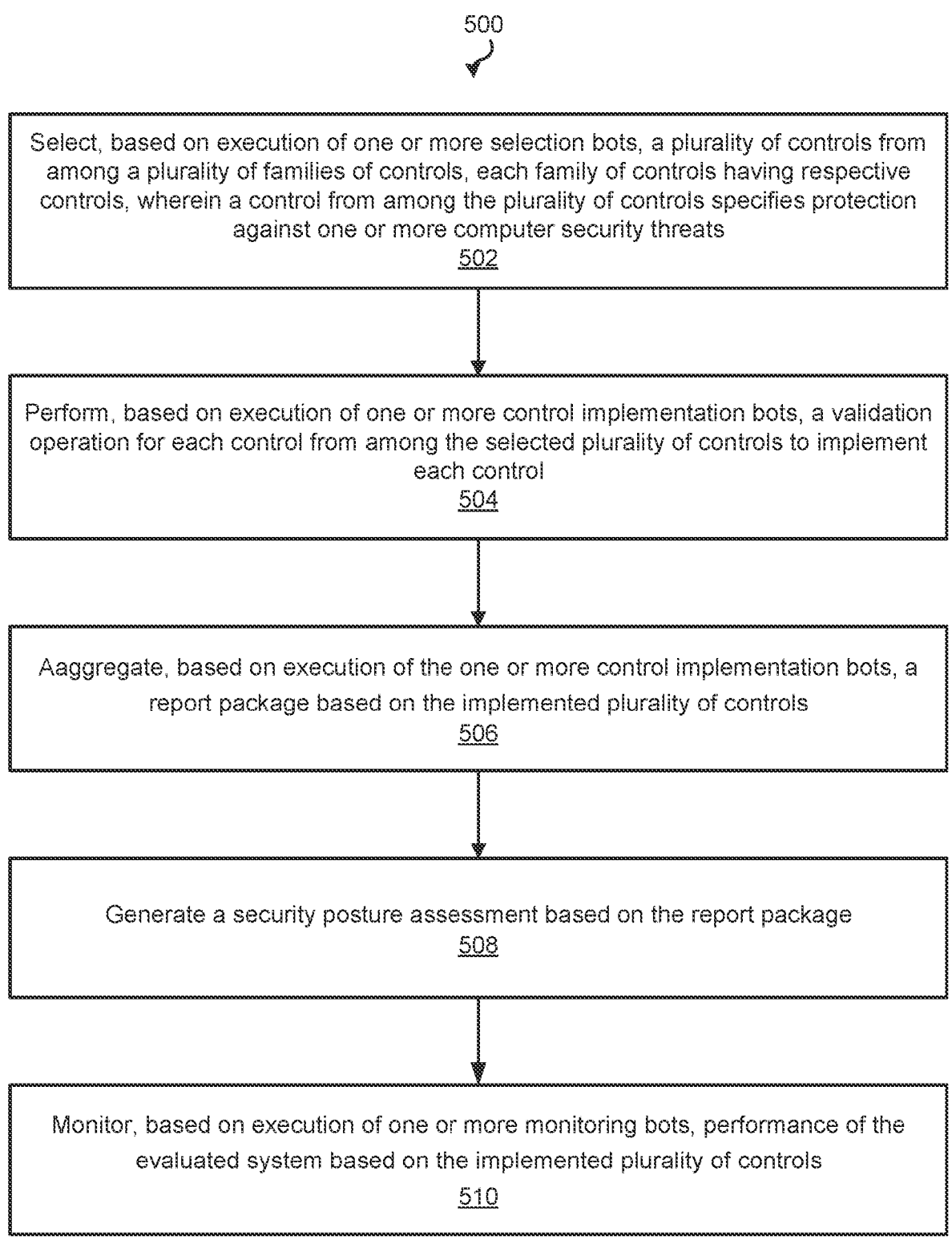
FIG. 5 illustrates an example of a method for security posture validation based on an intelligent automation framework.

FIG. 5 illustrates an example of a method 500 for security posture validation based on an intelligent automation framework. At 502, the method 500 may include selecting, based on execution of one or more selection bots, a plurality of controls from among a plurality of families of controls, each family of controls having respective controls. A selection bot may include a bot 122 tasked with selecting controls. A control from among the plurality of controls specifies protection against one or more security threats. The security threats are threats that may affect the security of a computer system, such as the evaluated system 101. The security threats may include, without limitation, malicious attacks, structural failures, and/or human error.

At 504, the method 500 may include performing, based on execution of one or more control implementation bots, a validation operation for each control from among the selected plurality of controls to implement each control. A control implementation bot is a bot 122 that is tasked with implementing a control.

At 506, the method 500 may include aggregating, based on execution of the one or more control implementation bots, a report package based on the implemented plurality of controls. At 508, the method 500 may include generating a security posture assessment (such as security posture assessment 123) based on the report package. At 510, the method 500 may include monitoring, based on execution of one or more monitoring bots, performance of the evaluated system based on the implemented plurality of controls. A monitoring bot is a bot 122 tasked with monitoring the controls and/or evaluated system 101.

The processor 112 of the ATO system 110 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some embodiments, processor 112 may comprise a plurality of processing units. These processing units may be physically located within the same device, or processor 112 may represent processing functionality of a plurality of devices operating in coordination.

Processor 112 may be configured to execute or implement the intelligent automation framework 120 and its corresponding plurality of bots 122 by software; hardware; firmware; some combination of software, hardware, and/or firmware; and/or other mechanisms for configuring processing capabilities on processor 112. It should be appreciated that although the intelligent automation framework 120 and its bots 122 are illustrated in FIG. 1 as being co-located in the ATO system 110, 120 and 122 may be located remotely from the other components or features. The description of the functionality provided by the different components or features 120 and 122 described below is for illustrative purposes, and is not intended to be limiting, as any of the components or features 120 and 122 may provide more or less functionality than is described, which is not to imply that other descriptions are limiting. For example, one or more of the components or features 120 and 122 may be eliminated, and some or all of its functionality may be provided by others of the components or features 120 and 122 again which is not to imply that other descriptions are limiting. As another example, processor 112 may include one or more additional components that may perform some or all of the functionality attributed below to one of the components or features 120 and 122. The processor 112 may be programmed to execute one or more computer program components. The computer program components or features may include software programs and/or algorithms coded and/or otherwise embedded in the processor 112, for example.

The memory 114 may include a memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

The ATO system 110 may be connected to components such as the bot platform 150 or GRC tool 130 in the system environment 100 via a communication network (not illustrated), such as the Internet or the Internet in combination with various other networks, like local area networks, cellular networks, or personal area networks, internal organizational networks, and/or other networks. It should be noted that the ATO system 110 may transmit data, via the communication network, conveying the security posture assessment 123 to one or more devices, such as a device that hosts the GRC tool 130.

The databases and data stores (such as 121) may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific implementations described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system features illustrated in FIG. 1.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system having an intelligent bot architecture having a plurality of bots for automating security posture validation of a computer system, comprising:
   a memory that stores an intelligent automation framework for a plurality of bots that each perform a specified task involved in an aspect of automated security posture assessment of an evaluated system, wherein one or more bots of the intelligent automation framework automatically generates a ports and protocol validation;
   a processor programmed to:
      access a security category assigned to the evaluated system, the security category being based on an impact that a breach of security of the evaluated system would have on the evaluated system and/or a related system;
      select, based on execution of one or more selection bots and the security category, a plurality of controls from among a plurality of families of controls, each family of controls having respective controls, wherein a control from among the plurality of controls specifies protection against one or more security threats;
      perform, based on execution of one or more control implementation bots, a validation operation for each control from among the selected plurality of controls to implement each control;
      aggregate, based on execution of the one or more control implementation bots, a report package based on the implemented plurality of controls;
      generate a security posture assessment based on the report package; and
      monitor, based on execution of one or more monitoring bots, performance of the evaluated system based on the implemented plurality of controls.

2. The system of claim 1, wherein one or more bots of the intelligent automation framework automatically generates boundary diagram.

3. The system of claim 1, wherein one or more bots of the intelligent automation framework automatically generates a vulnerabilities validation.

4. The system of claim 1, wherein one or more bots of the intelligent automation framework automatically validates segregation of duties.

5. The system of claim 1, wherein the plurality of family controls comprises an access control family, and wherein the one or more control implementations bots comprises an access control family bot that implements an access control.

6. The system of claim 1, wherein one or more bots of the intelligent automation framework continuously monitors the selected controls for compliance with one or more security requirements.

7. A method for security posture validation of an evaluated system based on an intelligent automation framework for a plurality of bots that each perform a specified task involved in an aspect of automated security posture validation, wherein one or more bots of the intelligent automation framework automatically generates a ports and protocol validation, the method comprising:
   accessing, by a processor, a security category assigned to the evaluated system, the security category being based on an impact that a breach of security of the evaluated system would have on the evaluated system and/or a related system;
   selecting, by the processor, based on execution of one or more selection bots and the security category, a plurality of controls from among a plurality of families of controls, each family of controls having respective controls, wherein a control from among the plurality of controls specifies protection against one or more security threats;
   performing, by the processor, based on execution of one or more control implementation bots, a validation operation for each control from among the selected plurality of controls to implement each control;
   aggregating, by the processor, based on execution of the one or more control implementation bots, a report package based on the implemented plurality of controls;
   generating, by the processor, a security posture assessment based on the report package; and
   monitoring, by the processor, based on execution of one or more monitoring bots, performance of the evaluated system based on the implemented plurality of controls.

8. The method of claim 7, further comprising:
   generating, by one or more bots of the intelligent automation framework automatically, boundary diagram.

9. The method of claim 7, further comprising:
   automatically generating, by one or more bots of the intelligent automation framework, a vulnerabilities validation.

10. The method of claim 7, further comprising:
    automatically validating, by one or more bots of the intelligent automation framework, segregation of duties.

11. The method of claim 7, wherein the plurality of family controls comprises an access control family, and wherein the one or more control implementations bots comprises an access control family bot that implements an access control.

12. The method of claim 7, further comprising:
    continuously monitoring, by one or more bots of the intelligent automation framework, the selected controls for compliance with one or more security requirements.

13. A non-transitory computer-readable medium for security posture validation of an evaluated system based on an intelligent automation framework for a plurality of bots that each perform a specified task involved in an aspect of security posture validation, wherein one or more bots of the intelligent automation framework automatically generates a ports and protocol validation, the non-transitory computer-readable medium storing instructions that, when executed by one or more processors, program the one or more processors to:

access a security category assigned to the evaluated system, the security category being based on an impact that a breach of security of the evaluated system would have on the evaluated system and/or a related system;

select, based on execution of one or more selection bots and the security category, a plurality of controls from among a plurality of families of controls, each family of controls having respective controls, wherein a control from among the plurality of controls specifies protection against one or more security threats;

perform, based on execution of one or more control implementation bots, a validation operation for each control from among the selected plurality of controls to implement each control;

aggregate, based on execution of the one or more control implementation bots, a report package based on the implemented plurality of controls;

generate a security posture assessment based on the report package; and monitor, based on execution of one or more monitoring bots, performance of the evaluated system based on the implemented plurality of controls.

14. The non-transitory computer-readable medium of claim 13, wherein the plurality of family controls comprises an access control family, and wherein the one or more control implementations bots comprises an access control family bot that implements an access control.

15. The non-transitory computer-readable medium of claim 13, wherein one or more bots of the intelligent automation framework continuously monitors the selected controls for compliance with one or more security requirements.

* * * * *